United States Patent
Jiang

(10) Patent No.: US 11,463,009 B2
(45) Date of Patent: Oct. 4, 2022

(54) FLYING CAPACITOR CHARGING METHOD AND APPARATUS

(71) Applicant: Huawei Digital Power Technologies Co., Ltd., Shenzhen (CN)

(72) Inventor: Yiming Jiang, Shenzhen (CN)

(73) Assignee: HUAWEI DIGITAL POWER TECHNOLOGIES CO., LTD., Shenzhen (CN)

(*) Notice: Subject to any disclaimer, the term of this patent is extended or adjusted under 35 U.S.C. 154(b) by 45 days.

(21) Appl. No.: 17/103,250

(22) Filed: Nov. 24, 2020

(65) Prior Publication Data

US 2021/0083585 A1 Mar. 18, 2021

Related U.S. Application Data

(63) Continuation of application No. PCT/CN2019/106278, filed on Sep. 17, 2019.

(30) Foreign Application Priority Data

Oct. 24, 2018 (CN) .......................... 201811244229.4

(51) Int. Cl.
*H02M 3/158* (2006.01)
*H02J 7/34* (2006.01)
(Continued)

(52) U.S. Cl.
CPC ........... *H02M 3/1584* (2013.01); *H02J 7/345* (2013.01); *H02M 1/0095* (2021.05); *H02M 3/07* (2013.01)

(58) Field of Classification Search
CPC .... H02J 7/345; H02M 1/0095; H02M 3/1584; H02M 3/07
See application file for complete search history.

(56) References Cited

U.S. PATENT DOCUMENTS

2012/0153912 A1* 6/2012 Demski .................. H02M 3/07
                                                               323/282
2015/0244277 A1    8/2015 Wangemann et al.
(Continued)

FOREIGN PATENT DOCUMENTS

CN         102916603 A      2/2013
CN         104052278 A      9/2014
(Continued)

*Primary Examiner* — Nguyen Tran
(74) *Attorney, Agent, or Firm* — Womble Bond Dickinson (US) LLP

(57) ABSTRACT

This application provides a flying capacitor charging method and apparatus, applied to a multi-level topology circuit, to provide a flying capacitor charging solution with a small occupation area and strong applicability. The circuit is connected to an input power source by using a first switch, and is connected to an output power source by using a second switch. A first end of a first capacitor in flying capacitors in the circuit is connected to a first electrode of a first semiconductor switch transistor, a second end of the first capacitor in the flying capacitors in the circuit is connected to a second electrode of a second semiconductor switch transistor, and a second electrode of the first semiconductor switch transistor is connected to a first electrode of the second semiconductor switch transistor by using a second capacitor. The second capacitor is an input capacitor, an output capacitor, or another flying capacitor.

20 Claims, 8 Drawing Sheets

(51) Int. Cl.
    *H02M 1/00*     (2006.01)
    *H02M 3/07*     (2006.01)

(56) References Cited

U.S. PATENT DOCUMENTS

2018/0131271 A1    5/2018   Ying et al.
2018/0159346 A1*   6/2018   Liu .......................... H02J 7/00

FOREIGN PATENT DOCUMENTS

| | | |
|---|---|---|
| CN | 204190608 U | 3/2015 |
| CN | 105763037 A | 7/2016 |
| CN | 106230253 A | 12/2016 |
| CN | 105119512 B | 12/2017 |
| CN | 207542813 U | 6/2018 |
| CN | 109617148 A | 4/2019 |
| WO | 2009017783 A1 | 2/2009 |
| WO | 2018102689 A1 | 6/2018 |

* cited by examiner

FLYING CAPACITOR CHARGING METHOD AND APPARATUS

CROSS-REFERENCE TO RELATED APPLICATIONS

This application is a continuation of International Patent Application No. PCT/CN2019/106278, filed on Sep. 17, 2019, which claims priority to Chinese Patent Application No. 201811244229.4, filed on Oct. 24, 2018. The disclosures of the aforementioned applications are hereby incorporated by reference in their entireties.

TECHNICAL FIELD

This application relates to the field of power electronic technologies, and in particular, to a flying capacitor charging method and apparatus.

BACKGROUND

A direct current-direct current conversion circuit (DC/DC circuit for short) is a circuit for boosting or bucking a direct current. Both input and output of the DC/DC circuit are direct currents. The DC/DC circuit is widely applied to the fields of energy storage, electric vehicles, new energy, power systems, electronic computers, and the like. Based on a state of an output level, topology forms of the DC/DC circuit can be classified into two types: two-level topology and multi-level topology.

The multi-level topology is relative to the conventional two-level topology. The two-level topology means that an output level has only two states: 0 and 1. The multi-level topology means that an output level has at least three states. For example, if the output level has three states: 1, ½, and 0, the multi-level topology is referred to as three-level topology; and if the output level has five states: 1, ¾, ½, ¼, and 0, the multi-level topology is referred to as five-level topology. In addition, multi-level topology circuits are further classified into a diode catching multi-level topology circuit, a flying capacitor catching multi-level topology circuit, and other forms.

For example, FIG. 1 shows a flying capacitor catching three-level topology buck circuit. When the circuit shown in FIG. 1 works normally, a voltage of a flying capacitor Cfly is controlled to be ½*Vin, T1 and T4 are alternately closed, and T2 and T3 are alternately closed. In the circuit, before an input capacitor Cin is powered on (in other words, before the circuit works normally), the flying capacitor Cfly needs to be charged to half of an input voltage Vin. Otherwise, because a voltage Vout of Cout=0, voltages of T3 and T4 are 0; and a voltage Vfly of the flying capacitor Cfly=0 at the instant of power-on, that is, voltages of T2 and T3 are also both 0. In this case, provided that an input end is powered on, an entire voltage of Cin is applied to T1, and consequently T1 is damaged due to overvoltage. However, if the flying capacitor Cfly is charged to half of the input voltage Vin before the input end is powered on, a voltage of Cin is equally divided by T1 and T2. In this case, neither T1 nor T2 is damaged due to overvoltage. Specifically, when the input end is powered on without pre-charging the flying capacitor Cfly and when the input end is powered on with the flying capacitor Cfly pre-charged, a voltage of each semiconductor switch transistor in FIG. 1 may be shown in FIG. 3.

Therefore, how to pre-charge the flying capacitor before power-on is a problem urgent to be resolved.

During actual application, regardless of a specific topology form of the flying capacitor catching multi-level topology circuit, the flying capacitor needs to be pre-charged before the circuit works normally.

In the prior art, a flying capacitor in a multi-level topology circuit may be pre-charged by using a charging circuit shown in FIG. 2. The charging circuit may be considered as another circuit independent of the multi-level topology circuit, and is used only for pre-charging the flying capacitor. As shown in FIG. 2, four resistors R1, R2, R3, and R4 and corresponding control switches are used to form an RC network to charge a flying capacitor C. That is, four switches S1.1, S1.2, S2.1, and S2.2 are closed; and after the circuit reaches a steady state, R1 and R4 divide a voltage to obtain an upper-end voltage Vp of the flying capacitor C, and R2 and R3 divide a voltage to obtain a lower-end voltage Vn of the flying capacitor C. Vp−Vn is a voltage of the flying capacitor.

In the charging solution shown in FIG. 2, the additional charging circuit is needed to charge the flying capacitor, resulting in an increase in costs. In addition, because resistor power is directly proportional to the square of a voltage, for a low-voltage system, due to a low voltage, relatively small resistor power is needed and there is no need to connect a large quantity of resistors in parallel. Therefore, the solution has relatively low costs and relatively high reliability. However, for a high-voltage system, if charging needs to be performed quickly, a large-power resistor is needed or a large quantity of resistors need to be connected in parallel, resulting in an excessively large occupation area of the resistor(s). In addition, for a high-voltage system in which a plurality of topologies are connected in parallel, system power is relatively high and there are a relatively large quantity of flying capacitors, and therefore more resistors are needed. Therefore, the solution shown in FIG. 2 is weak in applicability.

In summary, the flying capacitor charging solution provided in the prior art has a problem that circuit costs is high and solution applicability is weak.

SUMMARY

Embodiments of this application provide a flying capacitor charging method and apparatus, to provide an easy-to-implement flying capacitor charging solution with a small occupation area and relatively strong applicability.

According to a first aspect, an embodiment of this application provides a flying capacitor charging method, where the method is applied to a flying capacitor catching multi-level topology circuit, the multi-level topology circuit is connected to an input power source by using a first switch, the multi-level topology circuit is connected to an output power source by using a second switch, and the multi-level topology circuit includes one or more flying capacitors; a first end of a first capacitor in the one or more flying capacitors is connected to a first electrode of a first semiconductor switch transistor, a second end of the first capacitor is connected to a second electrode of a second semiconductor switch transistor, and a second electrode of the first semiconductor switch transistor is connected to a first electrode of the second semiconductor switch transistor by using a second capacitor; and the first capacitor is any one of the one or more flying capacitors, and the second capacitor is an input capacitor, an output capacitor, or a flying capacitor other than the first capacitor in the one or more flying capacitors.

Specifically, the method includes the following operations: closing the first semiconductor switch transistor and the second semiconductor switch transistor, to connect the first capacitor to the second capacitor in parallel; charging the first capacitor and the second capacitor to a first specified voltage value; opening the first semiconductor switch transistor and the second semiconductor switch transistor; and charging the second capacitor to a second specified voltage value.

In the flying capacitor charging method provided in the first aspect, an existing structure in the multi-level topology circuit may be used to charge the flying capacitor. Compared with the prior art, in the foregoing solution, no additional charging circuit is needed to charge the flying capacitor, so that costs are reduced and the solution has stronger applicability. In addition, in the method provided in the first aspect, the first capacitor is any flying capacitor, the second capacitor is the input capacitor, the output capacitor, or another flying capacitor, and the first capacitor and the second capacitor are respectively charged to ideal voltage values after the multi-level topology circuit is disconnected from the input power source and the output power source. After all the flying capacitors in the multi-level circuit are pre-charged by using the foregoing method, all the flying capacitors in the circuit can be charged to ideal voltage values, to prevent a semiconductor switch transistor from being damaged due to overvoltage when the multi-level topology circuit is powered on.

In this embodiment of this application, the multi-level topology circuit may be a circuit that is used only for bucking or used only for boosting, or may be a buck-boost conversion circuit.

If the multi-level topology circuit is a circuit that is used only for bucking or used only for boosting, during specific implementation, charging may be started on an input side (that is, the flying capacitor is charged by connecting an external direct current power source between two ends of the input capacitor in parallel, or by connecting a soft-start resistor to the input power source), or charging may be started on an output side (that is, the flying capacitor is charged by connecting an external direct current power source between two ends of the output capacitor in parallel, or by connecting a soft-start resistor to the output power source).

Regardless of whether charging is started on the input side or charging is started on the output side, for a buck circuit, the flying capacitors and the input capacitor in the circuit are first charged by performing the method provided in the first aspect. In this case, the first switch may be closed after the one or more flying capacitors and the input capacitor are all charged; then, the multi-level topology circuit may be adjusted to a normal working state, and the output capacitor may be controlled to be charged to a third specified voltage value, where the third specified voltage value is a voltage value of the output power source; and finally, the second switch may be closed.

In the foregoing solution, after the flying capacitors and the input capacitor in the buck circuit are all charged, the output capacitor may continue to be charged. The multi-level topology circuit can work normally after all the flying capacitors, the input capacitor, and the output capacitor in the circuit are all charged.

Regardless of whether charging is started on the input side or charging is started on the output side, for a boost circuit, the flying capacitors and the output capacitor in the circuit are first charged by performing the method provided in the first aspect. In this case, the second switch may be closed after the one or more flying capacitors and the output capacitor are all charged; then, the multi-level topology circuit may be adjusted to a normal working state, and the input capacitor may be controlled to be charged to a fourth specified voltage value, where the fourth specified voltage value is a voltage value of the input power source; and finally, the first switch may be closed.

In the foregoing solution, after the flying capacitors and the output capacitor in the boost circuit are all charged, the input capacitor may continue to be charged. The multi-level topology circuit can work normally after all the flying capacitors, the input capacitor, and the output capacitor in the circuit are all charged.

If the multi-level topology circuit is a buck-boost conversion circuit, during specific implementation, charging may be started on an input side, or charging may be started on an output side.

If charging is started on the input side, for the buck-boost conversion circuit, some flying capacitors and the input capacitor in the circuit are first charged by performing the method provided in the first aspect. In this case, the first switch may be closed after a first part of flying capacitors in the one or more flying capacitors and the input capacitor are all charged, where the multi-level topology circuit is a buck-boost conversion circuit, and the first part of flying capacitors are all flying capacitors in a buck circuit or a boost circuit in which the first capacitor is located; then, the multi-level topology circuit may be adjusted to a normal working state, the output capacitor may be controlled to be charged to a fifth specified voltage value, where the fifth specified voltage value is a voltage value of the output power source, and a second part of flying capacitors in the one or more flying capacitors may be controlled to be charged respectively to respective ideal voltage values; and finally, the second switch may be closed.

In the foregoing solution, if charging is started on the input side, after the first part of flying capacitors and the input capacitor in the buck-boost conversion circuit are all charged, the output capacitor and the second part of flying capacitors may continue to be charged. The multi-level topology circuit can work normally after all the flying capacitors, the input capacitor, and the output capacitor in the circuit are all charged.

If charging is started on the output side, for the buck-boost conversion circuit, some flying capacitors and the output capacitor in the circuit are first charged by performing the method provided in the first aspect. In this case, the second switch may be closed after a first part of flying capacitors in the one or more flying capacitors and the output capacitor are all charged, where the multi-level topology circuit is a buck-boost conversion circuit, and the first part of flying capacitors are all flying capacitors in a buck circuit or a boost circuit in which the first capacitor is located; then, the multi-level topology circuit may be adjusted to a normal working state, the input capacitor may be controlled to be charged to a sixth specified voltage value, where the sixth specified voltage value is a voltage value of the input power source, and a second part of flying capacitors in the one or more flying capacitors may be controlled to be charged respectively to respective ideal voltage values; and finally, the first switch may be closed.

In the foregoing solution, if charging is started on the output side, after the first part of flying capacitors and the output capacitor in the buck-boost conversion circuit are all charged, the input capacitor and the second part of flying capacitors may continue to be charged. The multi-level topology circuit can work normally after all the flying capacitors, the input capacitor, and the output capacitor in the circuit are all charged.

In one embodiment, the first specified voltage value is $U*\frac{1}{2}^N$, the second specified voltage value is $U*\frac{1}{2}^{N-1}$, U is a voltage value of the input power source or a voltage value of the output voltage, and N is a positive integer.

In one embodiment, the first capacitor may be specifically charged to the first specified voltage value in either of the following two manners: charging the first capacitor to the first specified voltage value by using an external direct current power source; or charging the first capacitor to the first specified voltage value by connecting a soft-start resistor to the input power source or the output power source.

In the foregoing solution, the first capacitor and the second capacitor may be charged by using the external direct current power source, or the first capacitor and the second capacitor may be charged by using the input power source or the output power source connected to the soft-start resistor. When the external direct current power source is used for charging, for a multi-parallel multi-level topology structure, only one external direct current power source may be used to charge capacitors in the multi-topology circuit, to save costs. When the soft-start resistor is used for charging, because the soft-start resistor is an inherent component in the multi-level topology circuit, the flying capacitor can be charged without increasing hardware costs.

According to a second aspect, an embodiment of this application provides a flying capacitor charging apparatus, where the apparatus includes a multi-level topology circuit and a controller. The multi-level topology circuit is connected to an input power source by using a first switch, the multi-level topology circuit is connected to an output power source by using a second switch, and the multi-level topology circuit includes one or more flying capacitors; a first end of a first capacitor in the one or more flying capacitors is connected to a first electrode of a first semiconductor switch transistor, a second end of the first capacitor is connected to a second electrode of a second semiconductor switch transistor, and a second electrode of the first semiconductor switch transistor is connected to a first electrode of the second semiconductor switch transistor by using a second capacitor; and the first capacitor is any one of the one or more flying capacitors, and the second capacitor is an input capacitor, an output capacitor, or a flying capacitor other than the first capacitor in the one or more flying capacitors.

The controller is configured to: close the first semiconductor switch transistor and the second semiconductor switch transistor, to connect the first capacitor to the second capacitor in parallel; charge the first capacitor and the second capacitor to a first specified voltage value; open the first semiconductor switch transistor and the second semiconductor switch transistor; and charge the second capacitor to a second specified voltage value.

In one embodiment, the controller is further configured to: close the first switch after the one or more flying capacitors and the input capacitor are all charged; adjust the multi-level topology circuit to a normal working state, and control the output capacitor to be charged to a third specified voltage value, where the third specified voltage value is a voltage value of the output power source; and close the second switch.

In one embodiment, the controller is further configured to: close the second switch after the one or more flying capacitors and the output capacitor are all charged; adjust the multi-level topology circuit to a normal working state, and control the input capacitor to be charged to a fourth specified voltage value, where the fourth specified voltage value is a voltage value of the input power source; and close the first switch.

In one embodiment, the controller is further configured to: close the first switch after a first part of flying capacitors in the one or more flying capacitors and the input capacitor are all charged, where the multi-level topology circuit is a buck-boost conversion circuit, and the first part of flying capacitors are all flying capacitors in a buck circuit or a boost circuit in which the first capacitor is located; adjust the multi-level topology circuit to a normal working state, control the output capacitor to be charged to a fifth specified voltage value, where the fifth specified voltage value is a voltage value of the output power source, and control a second part of flying capacitors in the one or more flying capacitors to be charged respectively to respective ideal voltage values; and close the second switch.

In one embodiment, the controller is further configured to: close the second switch after a first part of flying capacitors in the one or more flying capacitors and the output capacitor are all charged, where the multi-level topology circuit is a buck-boost conversion circuit, and the first part of flying capacitors are all flying capacitors in a buck circuit or a boost circuit in which the first capacitor is located; adjust the multi-level topology circuit to a normal working state, control the input capacitor to be charged to a sixth specified voltage value, where the sixth specified voltage value is a voltage value of the input power source, and control a second part of flying capacitors in the one or more flying capacitors to be charged respectively to respective ideal voltage values; and close the first switch.

In one embodiment, the first specified voltage value may be $U*\frac{1}{2}^N$, the second specified voltage value may be $U*\frac{1}{2}^{N-1}$, U is a voltage value of the input power source or a voltage value of the output voltage, and N is a positive integer.

In one embodiment, when charging the first capacitor to the first specified voltage value, the controller is specifically configured to: charge the first capacitor to the first specified voltage value by using an external direct current power source; or charge the first capacitor to the first specified voltage value by connecting a soft-start resistor to the input power source or the output power source.

According to a third aspect, an embodiment of this application provides a computer-readable storage medium. The computer-readable storage medium stores an instruction, and when the instruction runs on a computer, the computer is enabled to perform the method in the first aspect and various possible designs of the first aspect.

According to a fourth aspect, an embodiment of this application further provides a computer program product including an instruction. When the computer program product runs on a computer, the computer is enabled to perform the method in the first aspect and various possible designs of the first aspect.

According to a fifth aspect, an embodiment of this application further provides a computer chip. The chip is connected to a memory, and the chip is configured to read and execute a software program stored in the memory, to perform the method in the first aspect and various possible designs of the first aspect.

In addition, for a technical effect brought by any possible design manner in the second aspect to the fifth aspect, refer to technical effects brought by different design manners in the first aspect. Details are not described herein again.

DESCRIPTION OF EMBODIMENTS

Based on the foregoing problem, embodiments of this application provide a flying capacitor charging method and apparatus, to provide an easy-to-implement flying capacitor charging solution with a small occupation area and relatively strong applicability. The method and the apparatus are based on a same invention concept. The method and the apparatus have similar problem-resolving principles. Therefore, mutual reference may be made between apparatus implementation and method implementation, and no repeated description is provided.

It should be noted that, "a plurality of" in this application means "two or more". In addition, it should be understood that, words such as "first" and "second" in the description of this application are used only for description purposes and cannot be understood as an indication or implication of relative significance or as an indication or implication of an order.

Figure 4:
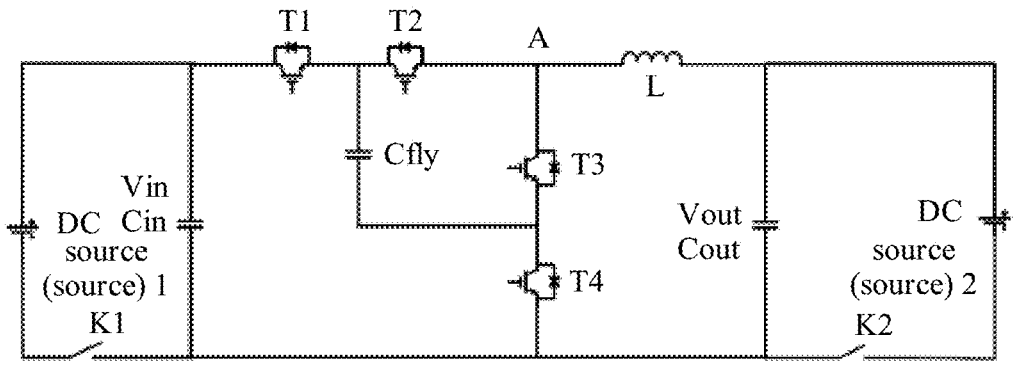
FIG. 4 is a schematic structural diagram of a first multi-level topology circuit according to an embodiment of this application.

The following briefly describes an application scenario of the embodiments of this application by using FIG. 4 as an example.

The flying capacitor charging method provided in the embodiments of this application is applicable to a three-level topology buck circuit shown in FIG. 4. The circuit includes an input power source DC source 1, an output power source DC source 2, an input capacitor Cin, an output capacitor Cout, an inductor L, a flying capacitor Cfly, a first switch K1, a second switch K2, and four semiconductor switch transistors T1, T2, T3, and T4.

There may be a plurality of types of semiconductor switch transistors. For example, the semiconductor switch transistor may be an insulated gate bipolar transistor (IGBT), or may be a metal-oxide-semiconductor field-effect transistor (MOSFET). The following describes a connection relationship between the components in the multi-level topology circuit shown in FIG. 4 by using an example in which the semiconductor switch transistor is an IGBT.

In the circuit shown in FIG. 4, Cin, Cout, Cfly, L, T1, T2, T3, and T4 form a buck circuit. The buck circuit is connected to the DC source 1 by using K1, and is connected to the output power source by using K2. The multi-level topology circuit includes one flying capacitor Cfly. A first end of Cfly is connected to an emitter of T1, a second end of Cfly is connected to a collector of T4, and a collector of T1 is connected to an emitter of T4 by using Cin.

In addition, an emitter of T2 is connected to a collector of T3 and a first end of L, a collector of T2 is connected to the emitter of T1, an emitter of T3 is connected to the collector of T4, a first end of Cout is connected to L, and a second end of Cout is connected to the emitter of T4.

In the circuit shown in FIG. 4, before Cin is powered on (in other words, before the circuit works normally), Cfly needs to be charged to half of Vin. Otherwise, because a voltage Vout of Cout=0, voltages of T3 and T4 are 0; and a voltage Vfly of the flying capacitor Cfly=0 at the instant of power-on, that is, voltages of T2 and T3 are also both 0. In this case, provided that Cin is powered on, an entire voltage of Cin is applied to T1, and consequently T1 is damaged due to overvoltage. However, if the flying capacitor Cfly is charged to half of the input voltage Vin before an input end is powered on, a voltage of Cin is equally divided by T1 and T2. In this case, neither T1 nor T2 is damaged due to overvoltage.

In the solution provided in the embodiments of this application, before the circuit works normally, K1 and K2 may be kept in an open state. Then, T1 and T4 are closed to connect Cfly and Cin in parallel, and Cfly and Cin are charged simultaneously: T1 and T4 are open after Cfly is charged, and Cin continues to be charged. After both Cfly and Cin are charged, K1 may be closed to charge Cout. After all the capacitors in the circuit are charged, K2 may be closed to enable the circuit to work normally.

It should be noted that FIG. 4 shows only one specific example of a topology structure to which the embodiments of this application are applicable. During actual implementation, the flying capacitor charging solution provided in the embodiments of this application is applicable to various multi-level topology circuits. Any one of the multi-level topology circuits to which the embodiments of this application are applicable includes a circuit structure that meets a connection relationship similar to the connection relationship between Cfly, Cin, T1, and T4 in FIG. 4. Therefore, in any one of the various multi-level topology circuits, the solution provided in the embodiments of this application can be used to control charging of capacitors such as Cfly and Cin, and control states of semiconductor switch transistors such as T1 and T4, to implement charging of the flying capacitor in the circuit.

To make the objectives, technical solutions, and advantages of this application clearer, the following further describes this application in detail with reference to the accompanying drawings.

Figure 5:
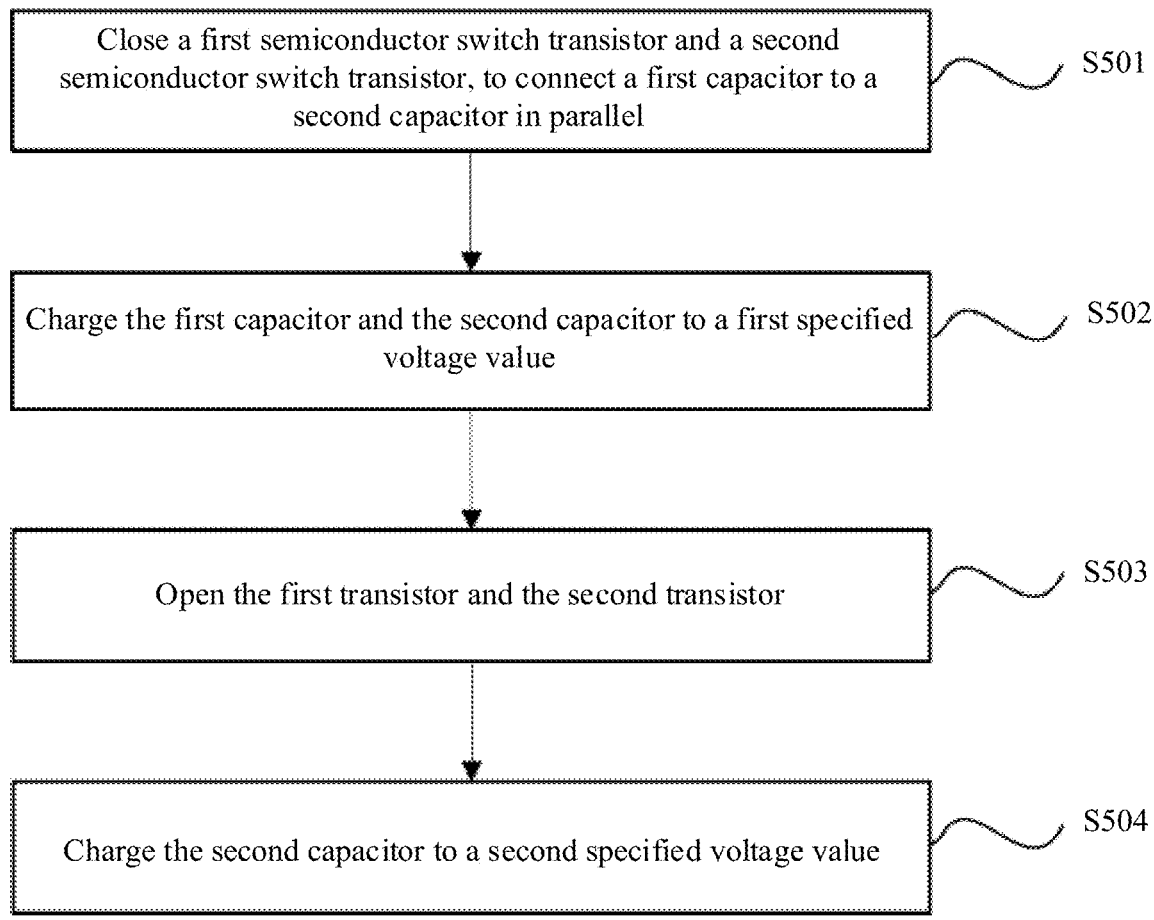
FIG. 5 is a schematic flowchart of a flying capacitor charging method according to an embodiment of this application.

FIG. 5 is a schematic flowchart of a flying capacitor charging method according to an embodiment of this application. The method is applied to a flying capacitor catching multi-level topology circuit. The multi-level topology circuit is connected to an input power source by using a first switch, the multi-level topology circuit is connected to an output power source by using a second switch, and the multi-level topology circuit includes one or more flying capacitors; a first end of a first capacitor in the one or more flying capacitors is connected to a first electrode of a first semiconductor switch transistor, a second end of the first capacitor is connected to a second electrode of a second semiconductor switch transistor, and a second electrode of the first semiconductor switch transistor is connected to a first electrode of the second semiconductor switch transistor by using a second capacitor; and the first capacitor is any one of the one or more flying capacitors, and the second capacitor is an input capacitor, an output capacitor, or a flying capacitor other than the first capacitor in the one or more flying capacitors.

The method includes the following operations.

S501. Close the first semiconductor switch transistor and the second semiconductor switch transistor, to connect the first capacitor to the second capacitor in parallel.

In this embodiment of this application, there may be a plurality of types of semiconductor switch transistors. For example, the semiconductor switch transistor may be an IGBT, or may be a MOSFET. If the semiconductor switch transistor in this embodiment of this application is an IGBT, the first electrode may be an emitter, and the second electrode may be a collector. If the semiconductor switch transistor in this embodiment of this application is a MOSFET, the first electrode may be a drain, and the second electrode may be a source.

It should be noted that the solution provided in this embodiment of this application is used to pre-charge the flying capacitors before the multi-level topology circuit works normally. The first switch and the second switch in the multi-level topology circuit may be normally open switches, namely, switches whose default states are an open state. Therefore, when S501 is performed, the multi-level topology circuit is not powered on, that is, the first switch and the second switch are in the open state.

When the first capacitor and the second capacitor are connected in parallel, charging the first capacitor is equivalent to also charging the second capacitor. The first capacitor is any one of the one or more flying capacitors, and the second capacitor is the input capacitor, the output capacitor, or a flying capacitor other than the first capacitor in the one or more flying capacitors. Therefore, when the first capacitor and the second capacitor are connected in parallel, the two flying capacitors may be charged simultaneously, or the input capacitor and the flying capacitor may be charged simultaneously, or the output capacitor and the flying capacitor may be charged simultaneously.

S502. Charge the first capacitor and the second capacitor to a first specified voltage value.

Figure 1:
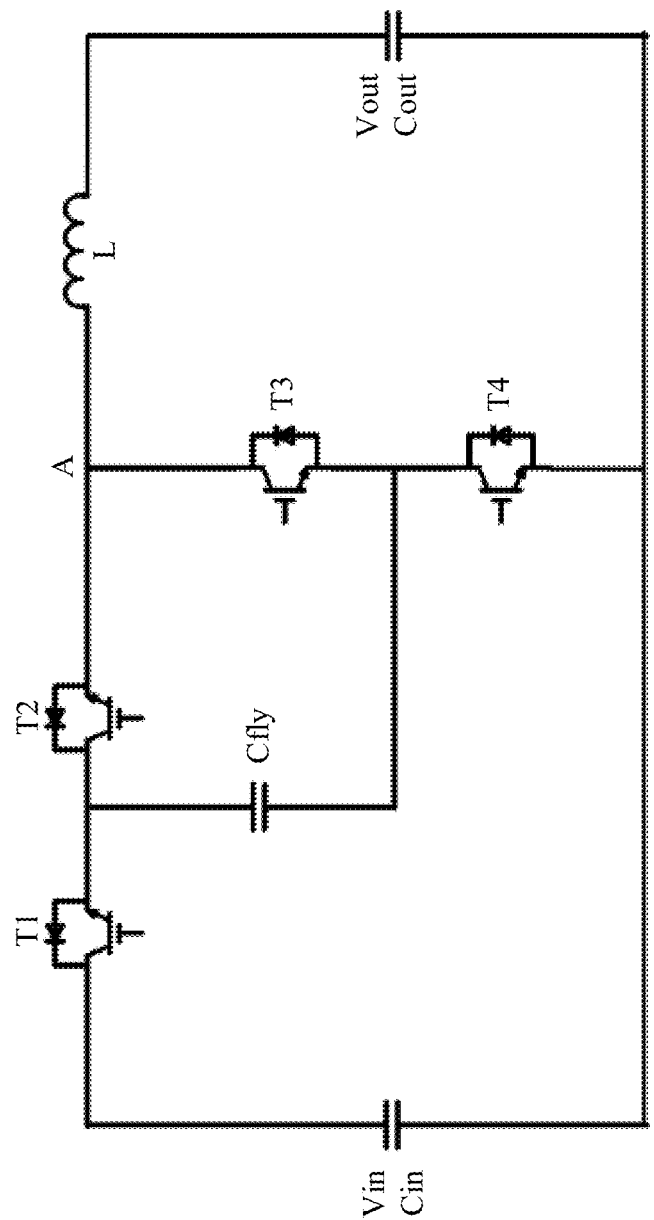
FIG. 1 is a schematic structural diagram of a flying capacitor catching three-level topology buck circuit according to the prior art.
Figure 2:
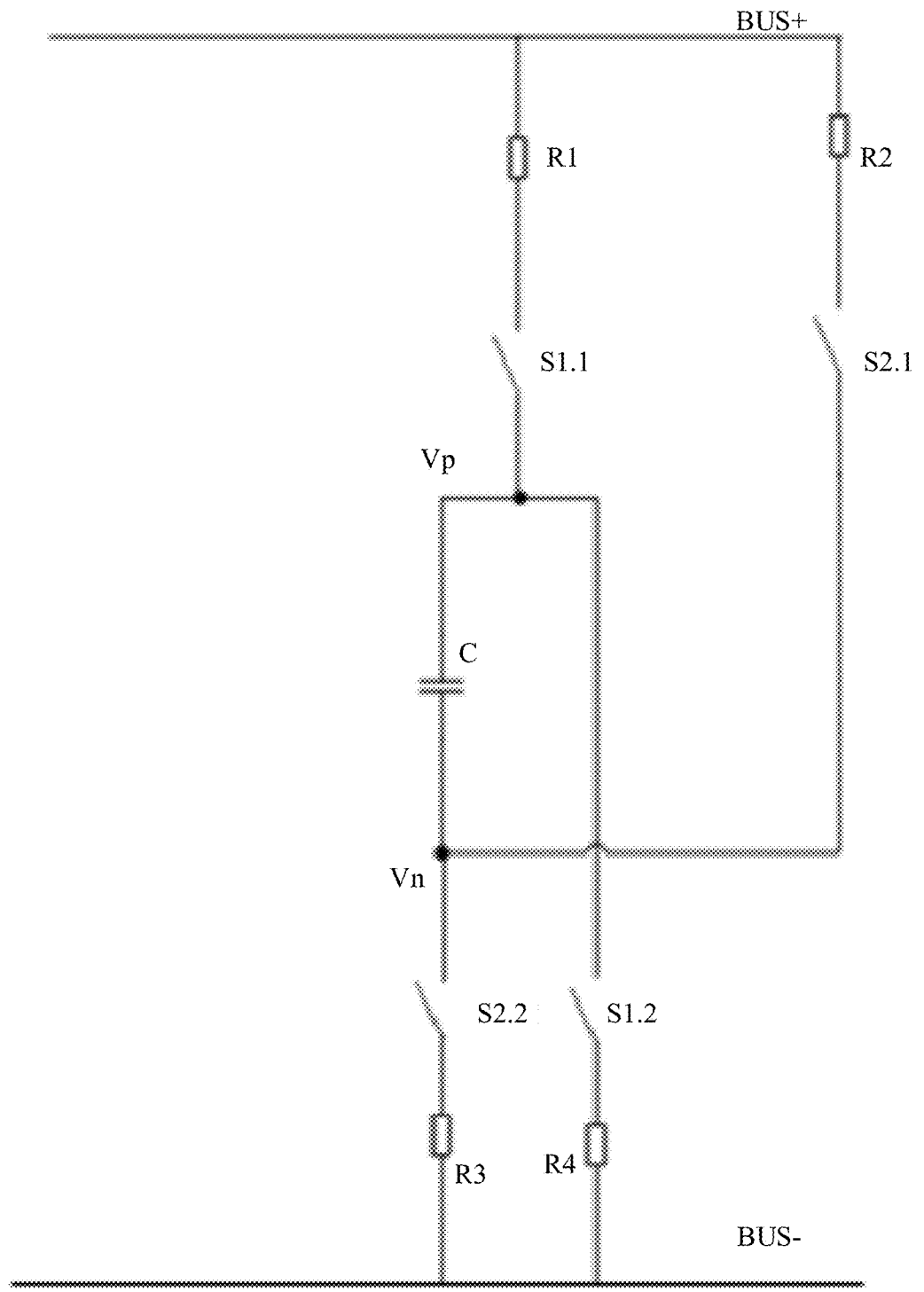
FIG. 2 is a schematic structural diagram of a charging circuit according to the prior art.
Figure 3:
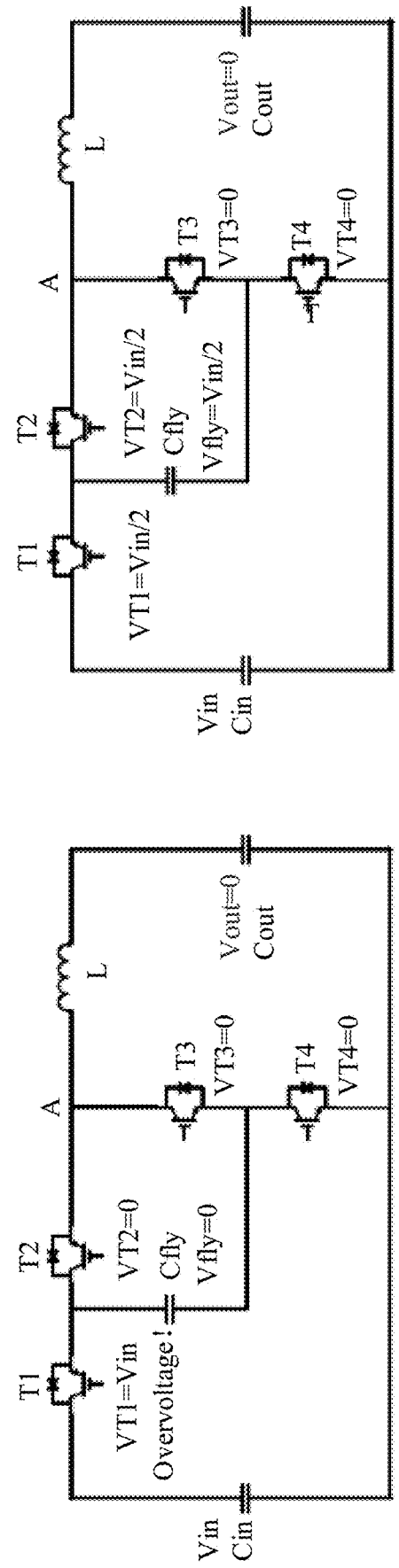
FIG. 3 is a schematic diagram of a voltage of each semiconductor switch transistor in a multi-level topology circuit according to an embodiment of this application.

The first specified voltage value is a voltage value of the first capacitor in a normal working state. For example, for the flying capacitor Cfly in FIG. 1, the first specified voltage value is ½*Vin.

Specifically, the first capacitor may be specifically charged to the first specified voltage value in the following two manners. In a first manner, the first capacitor is charged to the first specified voltage value by using an external direct current power source. In a second manner, the first capacitor is charged to the first specified voltage value by connecting a soft-start resistor to the input power source or the output power source.

That is, in this embodiment of this application, when a capacitor is charged, the capacitor may be charged by using an external direct current power source, or the capacitor may be charged by using the input power source or the output power source connected to a soft-start resistor. In the prior art, the soft-start resistor is mainly used for current limiting, to prevent a component in the circuit from being burnt due to an excessively large current during power-on. During actual application, the soft-start resistor may also be referred to as a current limiting resistor.

In addition to the first capacitor, another capacitor (for example, the second capacitor) in the circuit may also be charged in either of the foregoing two manners. A charging manner is not described below in detail.

As described above, because the first capacitor and the second capacitor are connected in parallel, when the first capacitor is charged, the second capacitor is also charged. If the second capacitor is the input capacitor, it is equivalent that the flying capacitor and the input capacitor are charged together. If the second capacitor is the output capacitor, it is equivalent that the flying capacitor and the output capacitor are charged together. If the second capacitor is a flying capacitor, it is equivalent to that the two flying capacitors are charged together, and in this case, the multi-level topology circuit includes at least two flying capacitors. For example, the multi-level topology circuit may be a five-level topology circuit or a nine-level topology circuit.

S503. Open the first semiconductor switch transistor and the second semiconductor switch transistor.

After the first semiconductor switch transistor and the second semiconductor switch transistor are open, the first capacitor and the second capacitor are no longer in a parallel connection relationship; and subsequently further charging the second capacitor does not affect a voltage value of the first capacitor.

S504. Charge the second capacitor to a second specified voltage value.

The second specified voltage value is a voltage value of the second capacitor in a normal working state. For example, in the circuit shown in FIG. 1, the flying capacitor Cfly is equivalent to the first capacitor; and if the input capacitor Cin is equivalent to the second capacitor, the second specified voltage value is Vin; or if the output capacitor Cout is equivalent to the second capacitor, the second specified voltage value is Vout.

In a specific example, the first specified voltage value may be $U*\frac{1}{2}^N$, the second specified voltage value may be $U*\frac{1}{2}^{N-1}$, U is a voltage value of the input power source or a voltage value of the output voltage, and N is a positive integer. For example, in the example in FIG. 1, the flying capacitor Cfly is equivalent to the first capacitor, and the input capacitor Cin is equivalent to the second capacitor. In this case, N=1 may be used, and therefore the first specified voltage value may be ½*Vin, and the second specified voltage value may be Vin.

In this embodiment of this application, provided that the first capacitor and the second capacitor are connected in parallel by using the first semiconductor switch transistor and the second semiconductor switch transistor, the flying capacitor charging method shown in FIG. 5 can be performed on the first capacitor and the second capacitor. That is, this embodiment of this application is applicable to a plurality of types of multi-level topology circuits, including but not limited to an N-parallel bidirectional BUCK-BOOST circuit, a three-level bidirectional BUCK circuit, a five-level topology circuit, a nine-level topology circuit, and the like.

Figure 6:
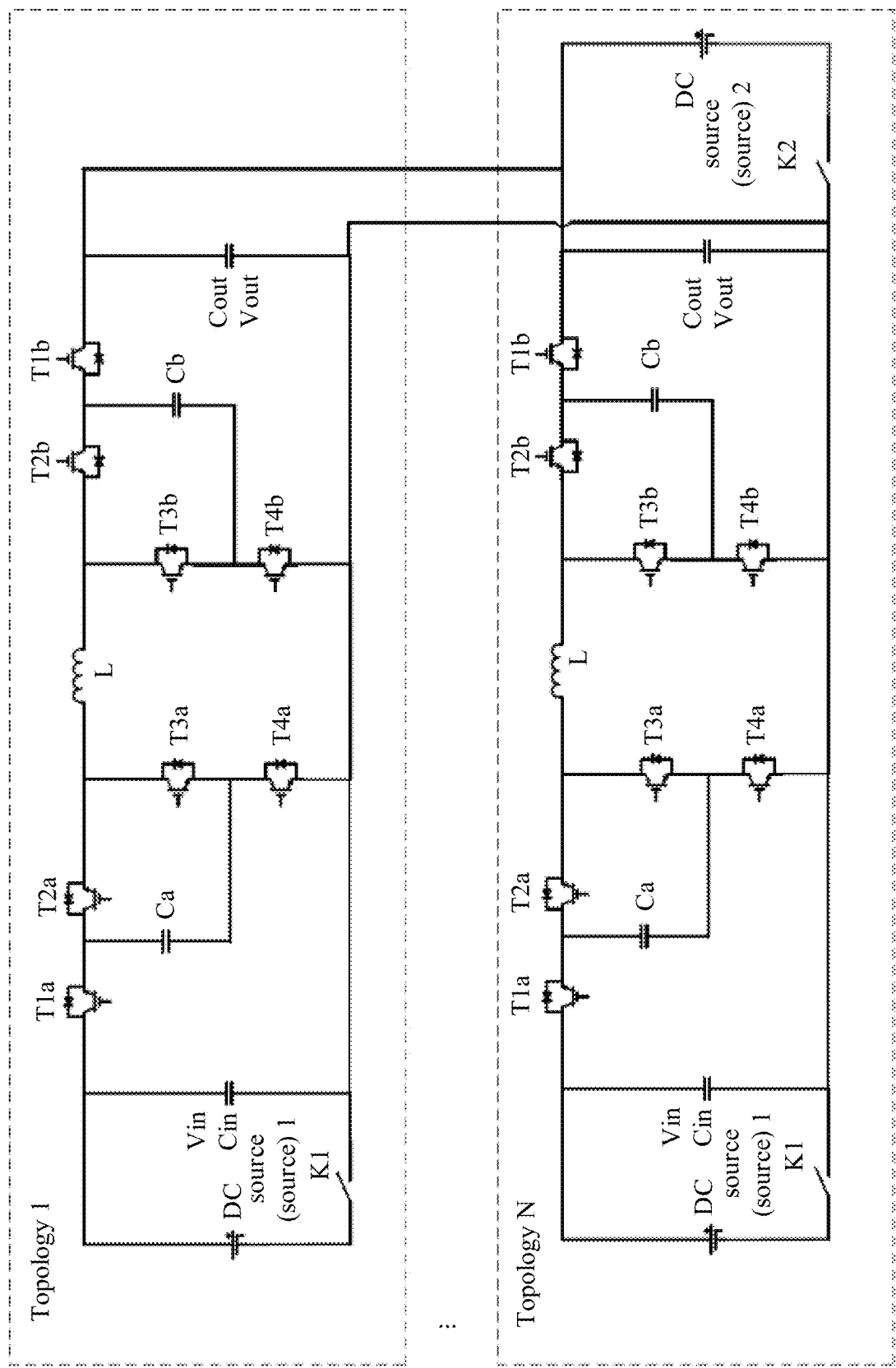
FIG. 6 is a schematic structural diagram of a second multi-level topology circuit according to an embodiment of this application.

For example, this embodiment of this application is applicable to an N-parallel bidirectional BUCK-BOOST circuit shown in FIG. 6. In the circuit shown in FIG. 6, a flying capacitor Ca may be considered as the first capacitor, an input capacitor Cin may be considered as the second capacitor, T1a may be considered as the first semiconductor switch transistor, and T4a may be considered as the second semiconductor switch transistor; or a flying capacitor Cb may be considered as the first capacitor, an output capacitor Cout may be considered as the second capacitor, T1*b* may be considered as the first semiconductor switch transistor, and T4*b* may be considered as the second semiconductor switch transistor.

If Ca is the first capacitor and Cin is the second capacitor, when the method shown in FIG. 5 is performed, Ca and Cin may be charged by using an external direct current power source, or Ca and Cin may be charged by using an input power source DC source 1 connected to a soft-start resistor. After Ca and Cin are charged by performing the method shown in FIG. 5, a first switch may be closed and each BUCK-BOOST circuit may be adjusted to a normal working state, to continue to charge Cb and Cout to ideal voltage values. Then, a second switch is closed, and therefore the circuit shown in FIG. 6 can work normally.

If Cb is the first capacitor and Cout is the second capacitor, when the method shown in FIG. 5 is performed, Cb and Cout may be charged by using an external direct current power source, or Cb and Cout may be charged by using an output power source DC source 2 connected to a soft-start resistor. After Cb and Cout are charged by performing the method shown in FIG. 5, a second switch may be closed and each BUCK-BOOST circuit may be adjusted to a normal working state, to continue to charge Ca and Cin to ideal voltage values. Then, a first switch is closed, and therefore the circuit shown in FIG. 6 can work normally.

For example, this embodiment of this application is applicable to a three-level bidirectional BUCK circuit shown in FIG. 4. In the circuit shown in FIG. 4, a flying capacitor Cfly may be considered as the first capacitor, an input capacitor Cin may be considered as the second capacitor, T1 may be considered as the first semiconductor switch transistor, and T4 may be considered as the second semiconductor switch transistor.

If Cfly is the first capacitor and Cin is the second capacitor, when the method shown in FIG. 5 is performed, Cfly and Cin may be charged by using an external direct current power source; or Cfly and Cin may be charged by using an input power source DC source 1 connected to a soft-start resistor; or Cfly and Cin may be charged by using an output power source DC source 2 connected to a soft-start resistor, and in this case, an output capacitor Cout is also charged. After Cfly and Cin are charged by performing the method shown in FIG. 5, a first switch K1 may be closed and the circuit shown in FIG. 4 may be adjusted to a normal working state, to continue to charge Cout to an ideal voltage value. Then, a second switch is closed, and therefore the circuit shown in FIG. 4 can work normally.

Figure 7:
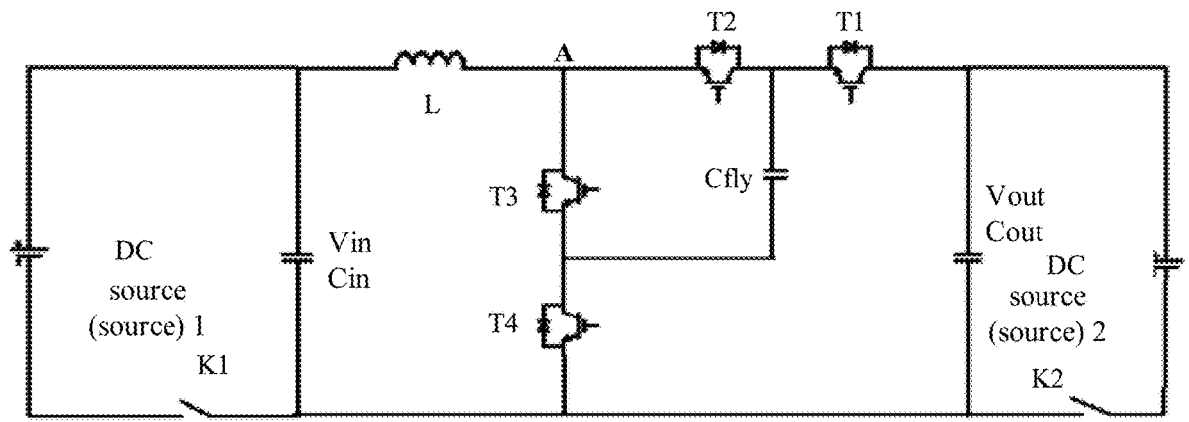
FIG. 7 is a schematic structural diagram of a third multi-level topology circuit according to an embodiment of this application.

For example, this embodiment of this application is applicable to a three-level bidirectional BOOST circuit shown in FIG. 7. In the circuit shown in FIG. 7, a flying capacitor Cfly may be considered as the first capacitor, an output capacitor Cout may be considered as the second capacitor, T1 may be considered as the first semiconductor switch transistor, and T4 may be considered as the second semiconductor switch transistor.

If Cfly is the first capacitor and Cout is the second capacitor, when the method shown in FIG. 5 is performed, Cfly and Cout may be charged by using an external direct current power source; or Cfly and Cout may be charged by using an output power source DC source 2 connected to a soft-start resistor; or Cfly and Cout may be charged by using an input power source DC source 1 connected to a soft-start resistor, and in this case, an input capacitor Cin is also charged. After Cfly and Cout are charged by performing the method shown in FIG. 5, a second switch K2 may be closed and the circuit shown in FIG. 7 may be adjusted to a normal working state, to continue to charge Cin to an ideal voltage value. Then, a first switch K1 is closed, and therefore the circuit shown in FIG. 7 can work normally.

Figure 8:
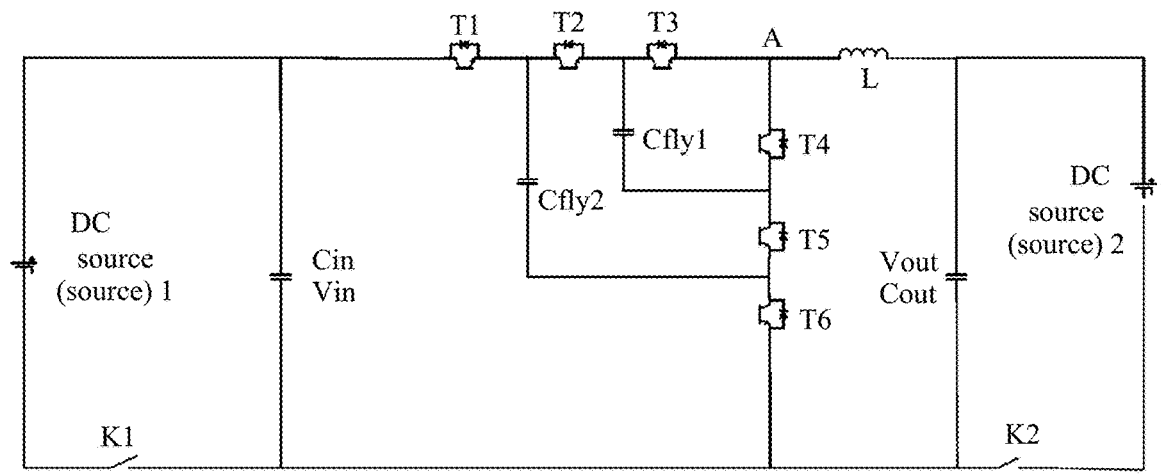
FIG. 8 is a schematic structural diagram of a fourth multi-level topology circuit according to an embodiment of this application.

For example, this embodiment of this application is applicable to a five-level topology circuit shown in FIG. 8. In the circuit shown in FIG. 8, a flying capacitor Cfly1 may be considered as the first capacitor, and a flying capacitor Cfly2 may be considered as the second capacitor. In this case, T2 is the first semiconductor switch transistor, and T5 is the second semiconductor switch transistor. Alternatively, in the circuit shown in FIG. 8, the flying capacitor Cfly2 may be considered as the first capacitor, and an input capacitor Cin may be considered as the second capacitor. In this case, T1 is the first semiconductor switch transistor, and T6 is the second semiconductor switch transistor.

During specific implementation, T1, T2, T5, and T6 may be closed simultaneously, and in this case, Cfly1, Cfly2, and Cin may be charged simultaneously. After Cfly1 is charged to ¼*Vin, T2 and T5 may be open. Then, Cfly2 and Cin continue to be charged. After Cfly2 is charged to ½*Vin, T1 and T6 may be open. Then, Cin continues to be charged. After Cfly1, Cfly2, and Cin are charged by performing the method shown in FIG. 5, a first switch K1 may be closed and the circuit shown in FIG. 8 may be adjusted to a normal working state, to continue to charge Cout to an ideal voltage value. Then, a second switch K2 is closed, and therefore the circuit shown in FIG. 8 can work normally.

In this embodiment of this application, if the multi-level topology circuit is a circuit that is used only for bucking or used only for boosting and that is shown in FIG. 4, FIG. 7, or FIG. 8, during specific implementation, charging may be started on an input side (that is, the flying capacitor is charged by connecting an external direct current power source between two ends of the input capacitor in parallel, or by connecting a soft-start resistor to the input power source), or charging may be started on an output side (that is, the flying capacitor is charged by connecting an external direct current power source between two ends of the output capacitor in parallel, or by connecting a soft-start resistor to the output power source). For example, in the circuit shown in FIG. 4, the first capacitor and the second capacitor may be charged by adding a direct current power source between two sides of Cin, or the first capacitor and the second capacitor may be charged by adding a direct current power source between two sides of Cout.

Regardless of whether charging is started on the input side or charging is started on the output side, for a buck circuit (for example, the circuit shown in FIG. 4 or FIG. 8), the flying capacitors and the input capacitor in the circuit are first charged by performing the method shown in FIG. 5. The first switch may be closed after the one or more flying capacitors (namely, all the flying capacitors in the circuit) and the input capacitor are all charged; then, the multi-level topology circuit may be adjusted to a normal working state, and the output capacitor may be controlled to be charged to a third specified voltage value, where the third specified voltage value is a voltage value of the output power source; and finally, the second switch may be closed. In this case, the multi-level topology circuit can work normally.

Adjusting the multi-level topology circuit to the normal working state is adjusting a closed state or an open state of each semiconductor switch transistor in the multi-level topology circuit to a state during normal working.

Regardless of whether charging is started on the input side or charging is started on the output side, for a boost circuit (for example, the circuit shown in FIG. 7), the flying capacitors and the output capacitor in the circuit are first charged by performing the method shown in FIG. 5. The second switch is closed after the one or more flying capacitors (namely, all the flying capacitors in the circuit) and the output capacitor are all charged; then, the multi-level topology circuit is adjusted to a normal working state, and the input capacitor is controlled to be charged to a fourth specified voltage value, where the fourth specified voltage value is a voltage value of the input power source; and finally, the first switch is closed. In this case, the multi-level topology circuit can work normally.

In this embodiment of this application, if the multi-level topology circuit is the BUCK-BOOST circuit (namely, a buck-boost conversion circuit) shown in FIG. 6, during specific implementation, charging may be started on an input side, or charging may be started on an output side. For example, in the circuit shown in FIG. 6, Ca and Cin may be charged by adding a direct current power source between two sides of Cin, or Cb and Cout may be charged by adding a direct current power source between two sides of Cout.

If charging is started on the input side, for the BUCK-BOOST circuit, some flying capacitors and the input capacitor in the circuit are first charged by performing the method shown in FIG. 5. The first switch may be closed after a first part of flying capacitors in the one or more flying capacitors and the input capacitor in the circuit are all charged; then, the multi-level topology circuit may be adjusted to a normal working state, the output capacitor may be controlled to be charged to a fifth specified voltage value, where the fifth specified voltage value is a voltage value of the output power source, and a second part of flying capacitors in the one or more flying capacitors may be controlled to be charged respectively to respective ideal voltage values; and finally, the second switch may be closed. In this case, the multi-level topology circuit can work normally.

The first part of flying capacitors are all flying capacitors in a BUCK circuit or a BOOST circuit in which the first capacitor is located. If charging is started on the input side, in the example in FIG. 6, the first part of flying capacitors include only Ca.

If charging is started on the output side, for the BUCK-BOOST circuit, some flying capacitors and the output capacitor in the circuit are first charged by performing the method shown in FIG. 5. The second switch is closed after a first part of flying capacitors in the one or more flying capacitors and the output capacitor are all charged; then, the multi-level topology circuit is adjusted to a normal working state, the input capacitor is controlled to be charged to a sixth specified voltage value, where the sixth specified voltage value is a voltage value of the input power source, and a second part of flying capacitors in the one or more flying capacitors are controlled to be charged respectively to respective ideal voltage values; and finally, the first switch is closed. In this case, the multi-level topology circuit can work normally.

The first part of flying capacitors are all flying capacitors in a BUCK circuit or a BOOST circuit in which the first capacitor is located. If charging is started on the output side, in the example in FIG. 6, the first part of flying capacitors include only Cb.

In the solution provided in this embodiment of this application, an existing structure in the multi-level topology circuit may be used to charge the flying capacitor. Compared with the prior art, in the solution provided in this embodiment of this application, no additional charging circuit is needed to charge the flying capacitor, so that costs are reduced and the solution has stronger applicability. In addition, in this embodiment of this application, the first capacitor is any flying capacitor, the second capacitor is the input capacitor, the output capacitor, or another flying capacitor, and the first capacitor and the second capacitor are respectively charged to ideal voltage values after the multi-level topology circuit is disconnected from the input power source and the output power source. After all the flying capacitors in the multi-level circuit are pre-charged by performing the method shown in FIG. 5, all the flying capacitors in the circuit can be charged to ideal voltage values, to prevent a semiconductor switch transistor from being damaged due to overvoltage when the multi-level topology circuit is powered on.

In addition, in this embodiment of this application, the first capacitor and the second capacitor may be charged by using the external direct current power source, or the first capacitor and the second capacitor may be charged by using the input power source or the output power source connected to the soft-start resistor. When the external direct current power source is used for charging, for a multi-parallel multi-level topology structure (for example, the topology structure shown in FIG. 6), only one external direct current power source may be used to charge capacitors in the multi-topology circuit, to save costs. When the soft-start resistor is used for charging, because the soft-start resistor is an inherent component in the multi-level topology circuit, the flying capacitor can be charged without increasing hardware costs.

As described above, the embodiments of this application are applicable to various flying capacitor catching multi-level topology circuits. The following describes flying capacitor charging methods for several specific circuit topologies by using several specific examples.

EXAMPLE 1

For a multi-level topology circuit shown in FIG. 6, flying capacitors (namely, Ca and Cb) may be charged in the following manner:

Working of a power electronic power circuit usually needs to be controlled by a controller. It may also be considered that execution of the flying capacitor pre-charging method provided in the embodiments of this application is controlled by a controller independent of a multi-level topology circuit. A power source that supplies power to the controller may be referred to as an auxiliary power source. A switch power source circuit whose input is a high voltage and output is a low voltage such as 12 V or 24 V usually may be used as the auxiliary power source.

S1. After the auxiliary power source is connected, control switch components T1b and T4b in each topology to be closed, to connect an output capacitor Cout to the flying capacitor Cb in parallel.

S2. Use a direct current power source (for example, a flyback power source), and connect output of the power source between two ends of the output capacitor Cout, to charge the output capacitor Cout and the flying capacitor Cb that are connected in parallel, where a target charging value is a voltage at which the flying capacitor Cb works normally, that is, half of a voltage of a DC source 2.

S3. After the flying capacitor reaches the target value, open T1b and T4b, to disconnect the flying capacitor Cb from the output capacitor Cout.

S4. Continue to charge the output capacitor Cout, where a target value is the voltage of the DC source 2.

S5. Stop charging after the target value is reached, and directly close K2 because a voltage of the output capacitor Cout is equal to the voltage of the DC source 2 and there is no voltage difference between two ends of K2.

S6. Buck-boost circuit normally transmits wave, and a controller adjusts a state of each semiconductor switch transistor, to control a voltage of an input capacitor Cin, where a target value is slowly increased from 0 to a voltage of a DC source 1, and control a voltage of Ca, where a target value is half of the voltage of the DC source 1.

S7. When a voltage value of the input capacitor Cin reaches the voltage of the DC source 1 and a voltage value of the flying capacitor Ca reaches half of the voltage of the DC source 1, directly close K1 because there is no voltage difference between two ends of K1.

Figure 9:
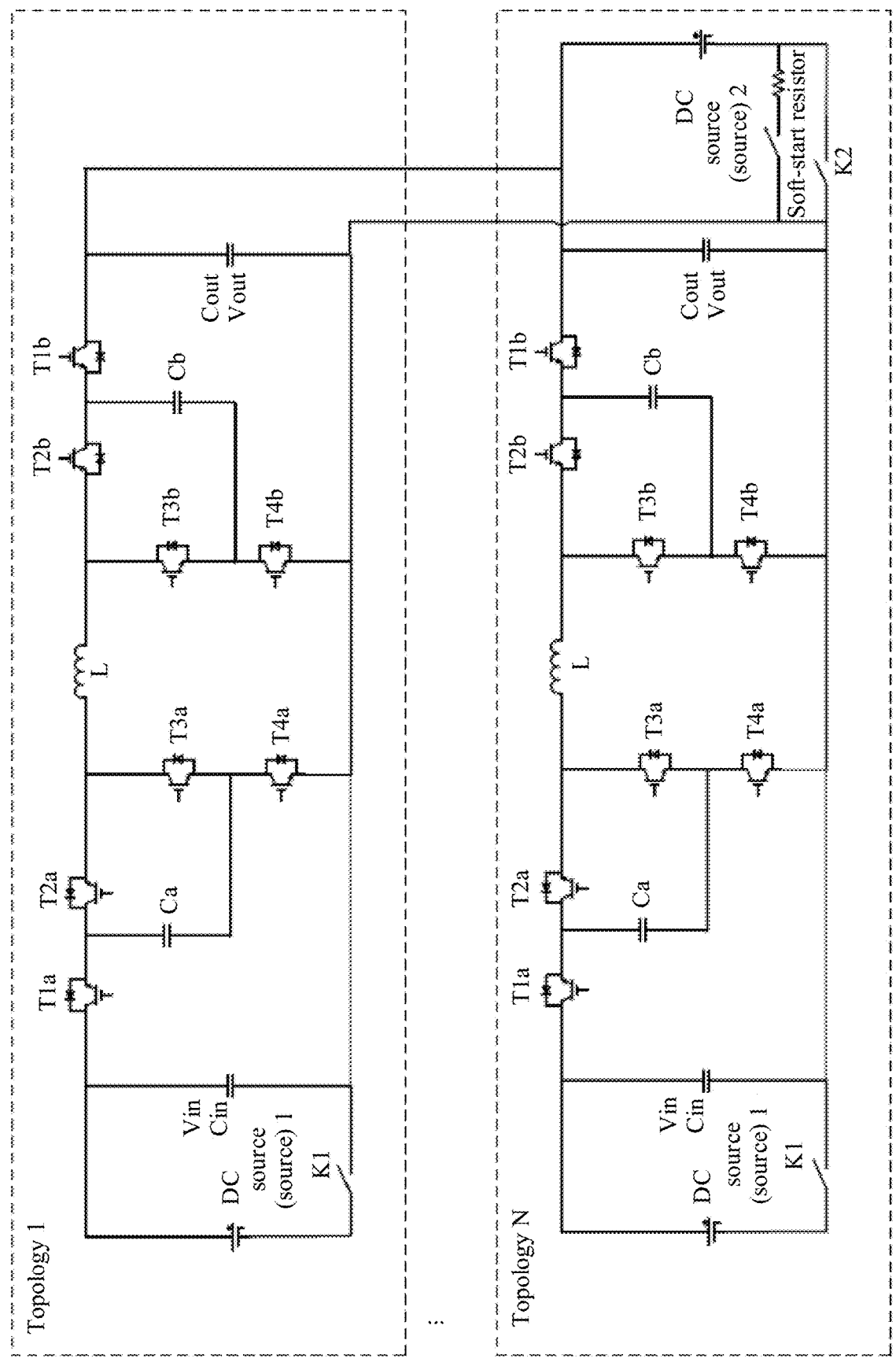
FIG. 9 is a schematic structural diagram of a fifth multi-level topology circuit according to an embodiment of this application.

In addition, in the example 1, alternatively, the output capacitor Cout and the flying capacitor Cb may be charged by using the output power source DC source 2 connected to a soft-start resistor, as shown in FIG. 9.

EXAMPLE 2

For a multi-level topology circuit shown in FIG. 4, a flying capacitor (namely, Cfly) may be charged in the following manner:

S1. After an auxiliary power source is connected, control switch components T1 and T4 in the topology circuit to be closed, to connect an input capacitor Cin to the flying capacitor Cfly in parallel.

S2. Use a direct current power source (for example, a flyback power source), and connect output of the power source between two ends of the input capacitor Cin, to charge the input capacitor Cin and the flying capacitor Cfly that are connected in parallel, where a target charging value is a voltage at which the flying capacitor Cfly works normally, that is, half of a voltage of a DC source 1.

S3. After the flying capacitor Cfly reaches the target value, open T1 and T4, to disconnect the flying capacitor Cfly from the input capacitor Cin.

S4. Continue to charge the input capacitor Cin, where a target value is the voltage of the DC source 1.

S5. Stop charging after the target value is reached, and directly close K1 because a voltage of the input capacitor Cin is equal to the voltage of the DC source 1 and there is no voltage difference between two ends of K1.

S6. The buck circuit normally transmits wave, and a controller adjusts a state of each semiconductor switch transistor, to control a voltage of an output capacitor Cout, where a target value is slowly increased from 0 to a voltage of a DC source 2.

S7. When the voltage of the capacitor Cout reaches the voltage of the DC source 2, directly close K2 because there is no voltage difference between two ends of K2.

Figure 10:
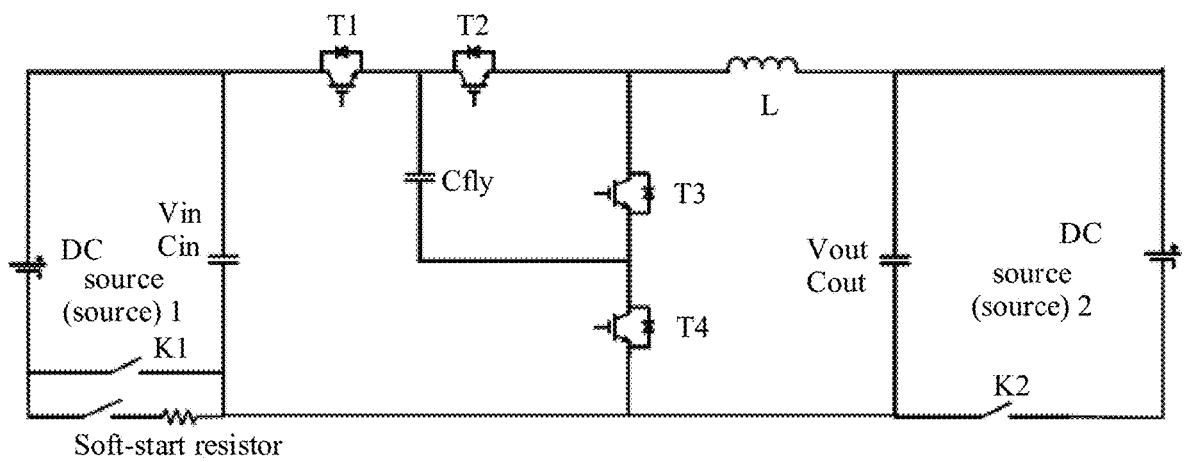
FIG. 10 is a schematic structural diagram of a sixth multi-level topology circuit according to an embodiment of this application.

In addition, in the example 2, alternatively, the input capacitor Cin and the flying capacitor Cfly may be charged by using the input power source DC source 1 connected to a soft-start resistor, as shown in FIG. 10.

EXAMPLE 3

For a multi-level topology circuit shown in FIG. 4, a flying capacitor (namely, Cfly) may be charged in the following manner:

S1. After an auxiliary power source is connected, control switch components T1 and T4 in the topology to be closed, to connect an input capacitor Cin to the flying capacitor Cfly in parallel.

S2. Use a direct current power source (for example, a flyback power source), and connect output of the power source between two ends of an output capacitor Cout, to charge three capacitors (namely, Cin, Cfly, and Cout) that are connected in parallel, where a target charging value is a voltage at which the flying capacitor works normally, that is, half of a voltage of a DC source 1.

S3. After the flying capacitor Cfly reaches the target value, open T1 and T4.

S4. Continue to charge the output capacitor Cout and the input capacitor Cin, where a target value is the voltage of the DC source 1.

S5. Stop charging after the target value is reached, and directly close K1 because a voltage of the input capacitor Cin is equal to the voltage of the DC source 1 and there is no voltage difference between two ends of K1.

S6. The buck circuit normally transmits wave, and a controller adjusts a state of each semiconductor switch transistor, to control a voltage of the output capacitor Cout, where a target value is increased from the voltage of the DC source 1 to a voltage of a DC source 2.

S7. When the voltage of the output capacitor Cout reaches the voltage of the DC source 2, directly close K2 because there is no voltage difference between two ends of K2.

In addition, in the example 3, alternatively, the input capacitor Cin, the output capacitor Cout, and the flying capacitor Cfly may be charged by using the power source DC source 2 connected to a soft-start resistor. Details are not described.

EXAMPLE 4

For a multi-level topology circuit shown in FIG. 8, a flying capacitor (namely, Cfly) may be charged in the following manner:

S1. After an auxiliary power source is connected, control switch components T1, T2, T5, and T6 in the topology to be closed, to connect an input capacitor Cin to a flying capacitor Cfly1 and a flying capacitor Cfly2 in parallel.

S2. Use a direct current power source (for example, a flyback power source), and connect output of the power source between two ends of the input capacitor Cin, to charge the input capacitor Cin, the flying capacitor Cfly1, and the flying capacitor Cfly2 that are connected in parallel, where a target charging value is a voltage at which the flying capacitor Cfly1 works normally, that is, ¼ of a voltage of a DC source 1.

S3. After the flying capacitor Cfly1 reaches the target value, open T2 and T5, to disconnect the flying capacitor Cfly1 from the input capacitor Cin. In this case, the flying capacitor Cfly2 is still connected to the input capacitor Cin in parallel.

S4. Continue to charge the flying capacitor Cfly2 and the input capacitor Cin, where a target charging value is a voltage at which the flying capacitor Cfly2 works normally, that is, half of the voltage of the DC source 1.

S5. After the flying capacitor Cfly2 reaches the target value, open T1 and T6, to disconnect the flying capacitor Cfly2 from the input capacitor Cin.

S6. Continue to charge the input capacitor Cin, where a target value is the voltage of the DC source 1.

S7. Stop charging after the target value is reached, and directly close K1 because a voltage of the input capacitor Cin is equal to the voltage of the DC source 1 and there is no voltage difference between two ends of K1.

S8. The buck circuit normally transmits wave, and a controller adjusts a state of each semiconductor switch transistor, to control a voltage of an output capacitor Cout, where a target value is slowly increased from 0 to a voltage of a DC source 2.

S9. When the voltage of the capacitor Cout reaches the voltage of the DC source 2, directly close K2 because there is no voltage difference between two ends of K2.

Based on a same invention concept, an embodiment of this application further provides a flying capacitor charging apparatus, and the apparatus may be configured to perform the flying capacitor charging method shown in FIG. 5.

Figure 11:
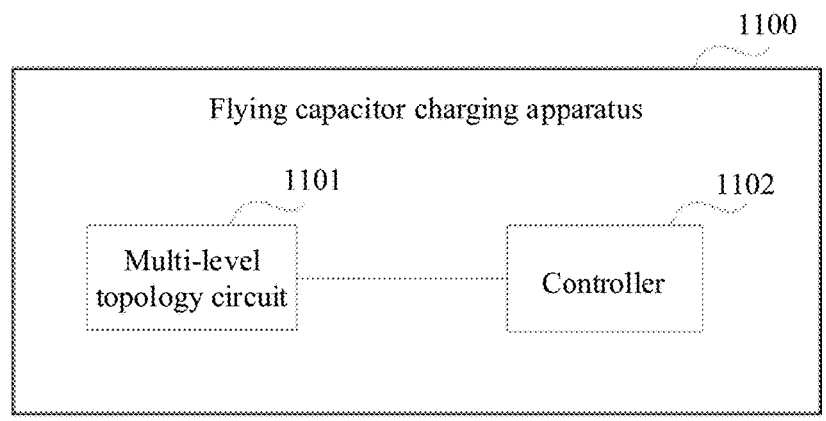
FIG. 11 is a schematic structural diagram of a flying capacitor charging apparatus according to an embodiment of this application.

Referring to FIG. 11, the flying capacitor charging apparatus 1100 includes a multi-level topology circuit 1101 and a controller 1102. The multi-level topology circuit is connected to an input power source by using a first switch, the multi-level topology circuit is connected to an output power source by using a second switch, and the multi-level topology circuit 1101 includes one or more flying capacitors. A first end of a first capacitor in the one or more flying capacitors is connected to a first electrode of a first semiconductor switch transistor, a second end of the first capacitor is connected to a second electrode of a second semiconductor switch transistor, and a second electrode of the first semiconductor switch transistor is connected to a first electrode of the second semiconductor switch transistor by using a second capacitor. The first capacitor is any one of the one or more flying capacitors, and the second capacitor is an input capacitor, an output capacitor, or a flying capacitor other than the first capacitor in the one or more flying capacitors.

The controller 1102 is configured to: close the first semiconductor switch transistor and the second semiconductor switch transistor, to connect the first capacitor to the second capacitor in parallel; charge the first capacitor and the second capacitor to a first specified voltage value; open the first semiconductor switch transistor and the second semiconductor switch transistor; and charge the second capacitor to a second specified voltage value.

It should be noted that a specific structure of the multi-level topology circuit 1101 is not limited in this embodiment of this application, provided that the multi-level topology circuit 1101 includes the first capacitor, the second capacitor, the first semiconductor switch transistor, and the second semiconductor switch transistor, and a connection relationship between the first capacitor, the second capacitor, the first semiconductor switch transistor, and the second semiconductor switch transistor meets the foregoing description. For example, the multi-level topology circuit 1101 may be any one of the multi-level topology circuits shown in FIG. 1, FIG. 4, and FIG. 6 to FIG. 10.

In one embodiment, when charging the first capacitor to the first specified voltage value, the controller 1102 is specifically configured to: charge the first capacitor to the first specified voltage value by using an external direct current power source; or charge the first capacitor to the first specified voltage value by connecting a soft-start resistor to the input power source or the output power source.

When the multi-level topology circuit 1101 is a circuit that is used only for bucking or used only for boosting, the controller 1102 is further configured to: close the first switch after the one or more flying capacitors and the input capacitor are all charged; adjust the multi-level topology circuit 1101 to a normal working state, and control the output capacitor to be charged to a third specified voltage value, where the third specified voltage value is a voltage value of the output power source; and close the second switch.

When the multi-level topology circuit 1101 is a circuit that is used only for bucking or used only for boosting, the controller 1102 is further configured to: close the second switch after the one or more flying capacitors and the output capacitor are all charged; adjust the multi-level topology circuit 1101 to a normal working state, and control the input capacitor to be charged to a fourth specified voltage value, where the fourth specified voltage value is a voltage value of the input power source; and close the first switch.

When the multi-level topology circuit 1101 is a buck-boost conversion circuit, the controller 1102 is further configured to: close the first switch after a first part of flying capacitors in the one or more flying capacitors and the input capacitor are all charged, where the multi-level topology circuit 1101 is a buck-boost conversion circuit, and the first part of flying capacitors are all flying capacitors in a buck circuit or a boost circuit in which the first capacitor is located; adjust the multi-level topology circuit 1101 to a normal working state, control the output capacitor to be charged to a fifth specified voltage value, where the fifth specified voltage value is a voltage value of the output power source, and control a second part of flying capacitors in the one or more flying capacitors to be charged respectively to respective ideal voltage values; and close the second switch.

When the multi-level topology circuit 1101 is a buck-boost conversion circuit, the controller 1102 is further configured to: close the second switch after a first part of flying capacitors in the one or more flying capacitors and the output capacitor are all charged, where the multi-level topology circuit 1101 is a buck-boost conversion circuit, and the first part of flying capacitors are all flying capacitors in a buck circuit or a boost circuit in which the first capacitor is located; adjust the multi-level topology circuit 1101 to a normal working state, control the input capacitor to be charged to a sixth specified voltage value, where the sixth specified voltage value is a voltage value of the input power source, and control a second part of flying capacitors in the one or more flying capacitors to be charged respectively to respective ideal voltage values; and close the first switch.

In one embodiment, the first specified voltage value is $U*\frac{1}{2}^N$, the second specified voltage value is $U*\frac{1}{2}^{N-1}$, U is a voltage value of the input power source or a voltage value of the output voltage, and N is a positive integer.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may be alternatively stored in a computer-readable memory that can instruct the computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be alternatively loaded onto a computer or another programmable data processing device, so that a series of operations and operations are performed on the computer or another programmable device, thereby generating computer-implemented processing. Therefore, the instructions executed on the computer or another programmable device provide operations for implementing a specific function in one or more processes in the flowcharts and/or in one or more blocks in the block diagrams.

What is claimed is:

1. A flying capacitor charging method applied to a flying capacitor multi-level topology circuit, comprising:
closing a first semiconductor switch transistor and a second semiconductor switch transistor, to connect a first capacitor to a second capacitor in parallel, wherein the multi-level topology circuit is connected to an input power source by using a first switch, wherein the multi-level topology circuit is connected to an output power source by using a second switch, wherein the multi-level topology circuit comprises one or more flying capacitors, wherein a first end of the first capacitor in the one or more flying capacitors is connected to a first electrode of the first semiconductor switch transistor, wherein a second end of the first capacitor is connected to a second electrode of the second semiconductor switch transistor, wherein the second capacitor is on an electrical path between a second electrode of the first semiconductor switch transistor and a first electrode of the second semiconductor switch transistor, and wherein the first capacitor is any one of the one or more flying capacitors, and the second capacitor is an input capacitor, an output capacitor, or a flying capacitor other than the first capacitor in the one or more flying capacitors;
charging the first capacitor and the second capacitor to a first voltage value;
opening the first semiconductor switch transistor and the second semiconductor switch transistor; and
charging the second capacitor to a second voltage value.

2. The method according to claim 1, further comprising:
closing the first switch after the one or more flying capacitors and the input capacitor are all charged;
adjusting the multi-level topology circuit to a normal working state, and controlling the output capacitor to be charged to a third voltage value, wherein the third voltage value is a voltage value of the output power source; and
closing the second switch.

3. The method according to claim 1, further comprising:
closing the second switch after the one or more flying capacitors and the output capacitor are all charged;
adjusting the multi-level topology circuit to a normal working state, and controlling the input capacitor to be charged to a fourth voltage value, wherein the fourth voltage value is a voltage value of the input power source; and
closing the first switch.

4. The method according to claim 1, further comprising:
closing the first switch after a first part of flying capacitors in the one or more flying capacitors and the input capacitor are all charged, wherein the multi-level topology circuit is a buck-boost conversion circuit, and wherein the first part of flying capacitors includes all flying capacitors in a buck circuit or a boost circuit in which the first capacitor is located;
adjusting the multi-level topology circuit to a normal working state, controlling the output capacitor to be charged to a fifth voltage value, wherein the fifth voltage value is a voltage value of the output power source, and controlling a second part of flying capacitors in the one or more flying capacitors to be charged to respective ideal voltage values; and
closing the second switch.

5. The method according to claim 1, further comprising:
closing the second switch after a first part of flying capacitors in the one or more flying capacitors and the output capacitor are all charged, wherein the multi-level topology circuit is a buck-boost conversion circuit, and wherein the first part of flying capacitors includes all flying capacitors in a buck circuit or a boost circuit in which the first capacitor is located;
adjusting the multi-level topology circuit to a normal working state, controlling the input capacitor to be charged to a sixth voltage value, wherein the sixth voltage value is a voltage value of the input power source, and controlling a second part of flying capacitors in the one or more flying capacitors to be charged respectively to respective ideal voltage values; and
closing the first switch.

6. The method according to claim 1, wherein the first voltage value is $U*\frac{1}{2}^N$, wherein the second voltage value is $U*\frac{1}{2}^{N-1}$, wherein U is a voltage value of the input power source or a voltage value of the output power source, and wherein N is a positive integer.

7. The method according to claim 1, wherein the charging the first capacitor to the first voltage value comprises:
charging the first capacitor to the first voltage value by using an external direct current power source; or
charging the first capacitor to the first voltage value by connecting a soft-start resistor to the input power source or the output power source.

8. A flying capacitor charging apparatus, comprising
a multi-level topology circuit, wherein the multi-level topology circuit is connected to an input power source by using a first switch, wherein the multi-level topology circuit is connected to an output power source by using a second switch, wherein the multi-level topology circuit comprises one or more flying capacitors, wherein a first end of a first capacitor in the one or more flying capacitors is connected to a first electrode of a first semiconductor switch transistor, wherein a second end of the first capacitor is connected to a second electrode of a second semiconductor switch transistor, wherein a second capacitor is on an electrical path between a second electrode of the first semiconductor switch transistor and a first electrode of the second semiconductor switch transistor, wherein the first capacitor is any one of the one or more flying capacitors, and wherein the second capacitor is an input capacitor, an output capacitor, or a flying capacitor other than the first capacitor in the one or more flying capacitors; and
a controller configured to:
close the first semiconductor switch transistor and the second semiconductor switch transistor, to connect the first capacitor to the second capacitor in parallel;
charge the first capacitor and the second capacitor to a first voltage value;
open the first semiconductor switch transistor and the second semiconductor switch transistor; and
charge the second capacitor to a second voltage value.

9. The apparatus according to claim 8, wherein the controller is further configured to:
close the first switch after the one or more flying capacitors and the input capacitor are all charged;
adjust the multi-level topology circuit to a normal working state, and control the output capacitor to be charged to a third voltage value, wherein the third voltage value is a voltage value of the output power source; and
close the second switch.

10. The apparatus according to claim 8, wherein the controller is further configured to:
close the second switch after the one or more flying capacitors and the output capacitor are all charged;
adjust the multi-level topology circuit to a normal working state, and control the input capacitor to be charged to a fourth voltage value, wherein the fourth voltage value is a voltage value of the input power source; and
close the first switch.

11. The apparatus according to claim 8, wherein the controller is further configured to:
close the first switch after a first part of flying capacitors in the one or more flying capacitors and the input capacitor are all charged, wherein the multi-level topology circuit is a buck-boost conversion circuit, and wherein the first part of flying capacitors includes all flying capacitors in a buck circuit or a boost circuit in which the first capacitor is located;
adjust the multi-level topology circuit to a normal working state, control the output capacitor to be charged to a fifth voltage value, wherein the fifth voltage value is a voltage value of the output power source, and control a second part of flying capacitors in the one or more flying capacitors to be charged respectively to respective ideal voltage values;
and close the second switch.

12. The apparatus according to claim 8, wherein the controller is further configured to:
close the second switch after a first part of flying capacitors in the one or more flying capacitors and the output capacitor are all charged, wherein the multi-level topology circuit is a buck-boost conversion circuit, and wherein the first part of flying capacitors includes all flying capacitors in a buck circuit or a boost circuit in which the first capacitor is located;
adjust the multi-level topology circuit to a normal working state, control the input capacitor to be charged to a sixth voltage value, wherein the sixth voltage value is a voltage value of the input power source, and control a second part of flying capacitors in the one or more flying capacitors to be charged respectively to respective ideal voltage values; and
close the first switch.

13. The apparatus according to claim 8, wherein the first specified voltage value is $U*\frac{1}{2}^N$, wherein the second specified voltage value is $U*\frac{1}{2}^{N-1}$, wherein U is a voltage value of the input power source or a voltage value of the output power source, and wherein N is a positive integer.

14. The apparatus according to claim 8, wherein when charging the first capacitor to the first voltage value, the controller is configured to:
charge the first capacitor to the first voltage value by using an external direct current power source; or
charge the first capacitor to the first voltage value by connecting a soft-start resistor to the input power source or the output power source.

15. A non-transitory computer-readable medium having instructions stored therein, which when executed by a processor, cause the processor to perform operations, the operations comprising:
closing a first semiconductor switch transistor and a second semiconductor switch transistor, to connect a first capacitor to a second capacitor in parallel, wherein a multi-level topology circuit is connected to an input power source by using a first switch, wherein the multi-level topology circuit is connected to an output power source by using a second switch, wherein the multi-level topology circuit comprises one or more flying capacitors, wherein a first end of the first capacitor in the one or more flying capacitors is connected to a first electrode of the first semiconductor switch transistor, wherein a second end of the first capacitor is connected to a second electrode of the second semiconductor switch transistor, wherein the second capacitor is on an electrical path between a second electrode of the first semiconductor switch transistor and a first electrode of the second semiconductor switch transistor, and wherein the first capacitor is any one of the one or more flying capacitors, and the second capacitor is an input capacitor, an output capacitor, or a flying capacitor other than the first capacitor in the one or more flying capacitors;
charging the first capacitor and the second capacitor to a first voltage value;
opening the first semiconductor switch transistor and the second semiconductor switch transistor; and
charging the second capacitor to a second voltage value.

16. The medium according to claim 15, wherein the operations further comprise:
closing the first switch after the one or more flying capacitors and the input capacitor are all charged;
adjusting the multi-level topology circuit to a normal working state, and controlling the output capacitor to be charged to a third voltage value, wherein the third voltage value is a voltage value of the output power source; and
closing the second switch.

17. The medium according to claim 15, wherein the operations further comprise:
closing the second switch after the one or more flying capacitors and the output capacitor are all charged;
adjusting the multi-level topology circuit to a normal working state, and controlling the input capacitor to be charged to a fourth voltage value, wherein the fourth voltage value is a voltage value of the input power source; and
closing the first switch.

18. The medium according to claim 15, wherein the operations further comprise:
closing the first switch after a first part of flying capacitors in the one or more flying capacitors and the input capacitor are all charged, wherein the multi-level topology circuit is a buck-boost conversion circuit, and wherein the first part of flying capacitors includes all flying capacitors in a buck circuit or a boost circuit in which the first capacitor is located;
adjusting the multi-level topology circuit to a normal working state, controlling the output capacitor to be charged to a fifth voltage value, wherein the fifth voltage value is a voltage value of the output power source, and controlling a second part of flying capacitors in the one or more flying capacitors to be charged to respective ideal voltage values; and
closing the second switch.

19. The medium according to claim 15, wherein the operations further comprise:

closing the second switch after a first part of flying capacitors in the one or more flying capacitors and the output capacitor are all charged, wherein the multi-level topology circuit is a buck-boost conversion circuit, and wherein the first part of flying capacitors includes all flying capacitors in a buck circuit or a boost circuit in which the first capacitor is located;

adjusting the multi-level topology circuit to a normal working state, controlling the input capacitor to be charged to a sixth voltage value, wherein the sixth voltage value is a voltage value of the input power source, and controlling a second part of flying capacitors in the one or more flying capacitors to be charged respectively to respective ideal voltage values; and closing the first switch.

20. The medium according to claim 15, wherein the first specified voltage value is $U*\frac{1}{2}^N$, wherein the second specified voltage value is $U*\frac{1}{2}^{N-1}$, wherein U is a voltage value of the input power source or a voltage value of the output power source, and wherein N is a positive integer.

* * * * *